United States Patent [19]
Darash

[11] 3,782,412
[45] Jan. 1, 1974

[54] UNBALANCED POPPET RELIEF VALVE

[75] Inventor: Raymond Nicholas Darash, Euclid, Ohio

[73] Assignee: The Weatherland Company, Cleveland, Ohio

[22] Filed: May 11, 1972

[21] Appl. No.: 252,407

[52] U.S. Cl. .............................. 137/514, 137/540
[51] Int. Cl. ............................................. F16k 15/06
[58] Field of Search .............. 137/514, 528, 533.21, 137/540, 543.17

[56] References Cited
UNITED STATES PATENTS

| | | | |
|---|---|---|---|
| 3,131,716 | 5/1964 | Griswold | 137/514 X |
| 2,969,084 | 1/1961 | Raymond | 137/514 X |
| 3,354,898 | 11/1967 | Barnes | 137/543.17 X |
| 3,363,646 | 1/1968 | Foreman | 137/533.71 X |
| 2,601,563 | 6/1952 | Selwyn | 137/540 |

Primary Examiner—Robert G. Nilson
Attorney—Harold F. McNenny et al.

[57] ABSTRACT

A relief valve assembly in which a spring supported poppet is stabilized against random movement or chatter by damping means responsive to relief flow. The damping means comprises a relief flow circuit which develops a fluid pressure distribution on the poppet having a net lateral component causing the poppet to frictionally engage axial guide surfaces of a poppet receiving chamber. Since frictional damping forces are only produced during relief flow, initial valve opening pressure is not adversely affected by irregular static frictional forces.

4 Claims, 3 Drawing Figures

PATENTED JAN 1 1974 3,782,412 ered generally includes a spring biased poppet arranged to sealingly engage a valve seat of a determined area. When the product of fluid pressure and valve seat area exceeds the spring bias force, the poppet is caused to move away from the valve seat to thereby open the valve and release fluid pressure.

UNBALANCED POPPET RELIEF VALVE

BACKGROUND OF THE INVENTION

The invention relates to fluid pressure control devices and in particular to improvements in direct pressure operated relief valves operable to permit fluid relief flow therethrough when fluid pressure exceeds a predetermined level.

More specifically, a type of relief valve herein considered generally includes a spring biased poppet arranged to sealingly engage a valve seat of a determined area. When the product of fluid pressure and valve seat area exceeds the spring bias force, the poppet is caused to move away from the valve seat to thereby open the valve and release fluid pressure.

While this type of relief valve is generally one of the least complex and least expensive to produce it is often characterized by certain problems involving random vibration or chatter of the poppet during service. Pressure pulsations of separate origin in associated circuitry may, commonly, cause chatter or rapid movement of the poppet. For instance, these pressure disturbances may be generated by a pressure supply pump, operation of separate control valves or fluctuations in load on the associated fluid circuitry. Random vibration or chatter in the relief poppet is known to result in premature wear of the sealing surfaces of the poppet and valve seat. This wear eventually results in fluid leakage and loss of precise pressure control. Besides this direct damage to the valve itself, poppet chatter may result in such undesirable situations as uneven and erratic operation of the associated fluid system, environmental noise, and wear or damage to other circuit components.

SUMMARY OF THE INVENTION

The invention provides poppet damping or stabilizing means in a direct pressure operated relief valve wherein random movement and chatter of the relief poppet is substantially eliminated. According to the invention, the stabilizing means generates friction damping forces on the relief poppet only when such forces are needed, that is, under conditions of relief flow. Under noflow conditions, friction damping forces are not developed by the stabilizing means so that undesirable static frictional force variations cannot influence the opening or cracking pressure rating of the valve.

In the preferred embodiment, the stabilizing or damping means includes an axial relief flow circuit past the poppet in which the circuit pressure distribution creates an unbalanced lateral force on the poppet to cause it to frictionally engage surfaces which guide its axial opening and closing movement. As disclosed, the poppet is guided in an axially extending poppet receiving chamber. Relief flow is caused to pass between the external surfaces of the poppet and internal chamber surfaces. The cross-sectional configurations of the poppet and its receiving chamber are arranged such that under relief flow a pressure drop along one side of the poppet is substantially greater than a pressure drop along a diametrically opposite side. With this configuration a net lateral pressure force is developed on the poppet causing the poppet to frictionally engage the chamber surfaces and thereby causing movement of the poppet to be damped.

DESCRIPTION OF THE PREFERRED EMBODIMENT

Figure 2:
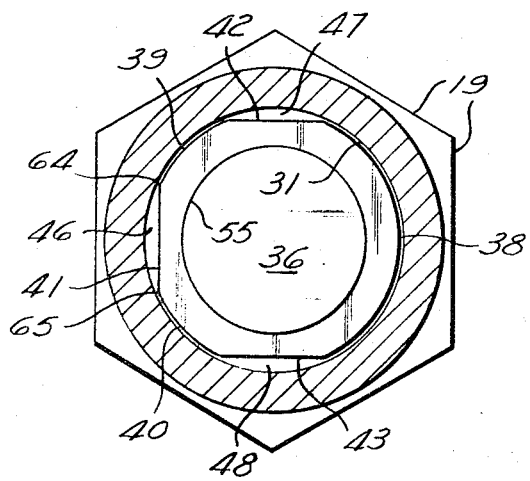
FIG. 2 is a cross-sectional view of the valve assembly taken along the line 2—2 indicated in FIG. 1.
Figure 3:
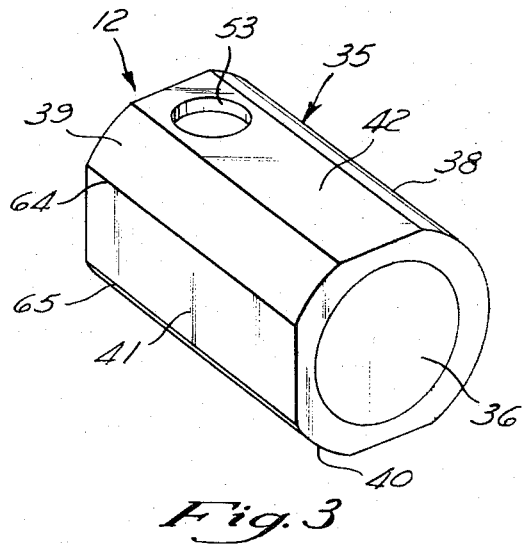
FIG. 3 is a perspective view of a relief poppet of the relief valve assembly.

Referring now to the drawings, there is shown a relief valve assembly 10 which has as its principal parts a valve body 11, a poppet 12, a relief spring 13 and a retaining plug 14. The valve body 11 is an elongated member having at one end an externally threaded extension 18 which is adapted to be threaded into a complementary internally threaded port of a fluid circuit (not shown). The valve body 11 may be machined or otherwise formed from a hexagonal blank so that wrenching flats 19, as seen in FIG. 2, are available to permit the valve body 11 to be suitably tightened into the threaded port of the fluid circuit. Typically, the valve body 11 is formed of metal such as steel, brass or aluminum but other rigid materials including plastics as well as other metals may, of course, be employed.

A valve port or passage in one end of the body 11 is formed by an axial cylindrical bore or passage 21 and an axial conical recess or counterbore 22. Fluid pressure in a system to be controlled by the valve 10 is in communication with these passages 21 and 22. At the other end of the body 11 there is formed an enlarged cylindrical axial bore or chamber 26. An outer end of the chamber 26 is internally threaded at 27. At an inner end of the chamber 26 there is formed a conical or undercut surface 29 extending from a cylindrical surface 31 forming the chamber 26 to the conical counterbore 22. A circular sharp edge or valve seat surface 33 is formed at the junction of the undercut surface 29 and conical bore 22. The undercut surface 29 insures that an area sealed by the poppet 12 is determined by the diameter of the valve seat 33 and not a larger diameter as might be the case if the undercut surface 29 was in a plane perpendicular to the axis of the valve body 11.

The poppet or valve closure means 12, preferably, is an assembly of a main body 35 slidably disposed in the chamber 26 and an insert member 36. The poppet body 35 is, ideally, formed of a metal such as steel, brass or aluminum but may be constructed of other suitably rigid materials. As illustrated, the poppet body 35 has external cylindrical surface portions 38, 39 and 40 defined by a common diameter which is slightly smaller than the diameter defining the cylindrical surface 31 of the chamber 26 so that the poppet 12 may slide in the chamber. Diametrically opposite a first cylindrical poppet surface 38 and intermediate the other cylindrical poppet surface portions 39 or 40 there is formed a flat or planar surface 41. Similarly, a pair of diametrically opposed flat surfaces 42 and 43 are provided between the cylindrical surface portion 38 and surface portions 39 and 40 respectively.

As explained below, a relief flow circuit is formed by axially extending spaces 46, 47 and 48 between the poppet flats 41, 42 and 43 and adjacent surface areas of the chamber 26. The relief flow circuit also includes a relatively small clearance between the first cylindrical poppet surface portion 38 and the adjacent surface area of the chamber 26. In one embodiment, this clearance is produced by dimensioning the poppet 12 with a nominal 0.006 inch diametral clearance in a chamber bore of approximately 0.450 inch diameter.

The insert member 36, ideally, is formed of rubber or elastomeric material such as neoprene so that it is sufficiently deformable and resilient to reliably provide complete circular sealing contact with valve port seat 33. The insert member 36 is held in a circular cavity 55 at a forward end of the poppet body 35 by means of an interference fit therewith, for example. At an outer end of the poppet body 35 there is formed a blind cylindrical spring receiving bore 51. A pair of radial openings 53 and 54 extend between the spring receiving bore 51 and the outer flat surfaces 42 and 43 of the poppet body 35.

The retaining plug 14 is a rigid circular member of metal or plastic or the like and is threaded on its periphery, designated 56, to permit it to be threaded into the threads 27 of the chamber 26. An inner end of the plug 14 is axially bored to form a spring receiving recess 57. An axial hole 58 between the spring receiving recess 57 and an outer end 59 of the plug 14 vents the poppet chamber 26. A diametral slot 61 in the plug end 59 may be engaged by an appropriate tool to rotate the plug 14 in the body 11 to adjustably precompress the relief spring or resilient poppet biasing means 13 to develop a minimum force corresponding to a desired relief pressure. An adjusted axial position of the plug 14 in the body 11 may be maintained by staking or otherwise plastically deforming an adjacent area of the body into interference with the plug 14.

Figure 1:
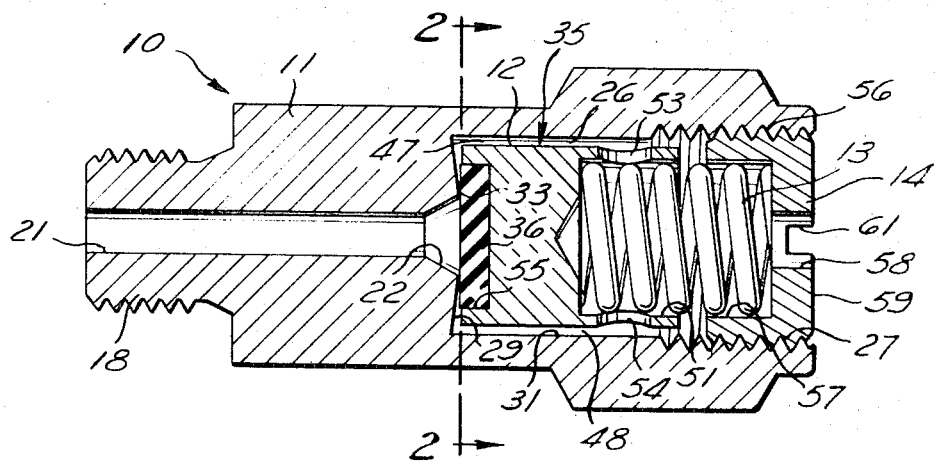
FIG. 1 is a longitudinal sectional view of a relief valve assembly in accordance with the invention.

The disclosed structure of the relief valve assembly 10 is particularly suited for use in refrigeration systems for protection against excessive refrigerant pressure. The operation of the relief valve assembly 10 is as follows. When fluid pressure in the valve port passages 21 and 22 is at a level above which the product of this pressure and the area defined by the valve seat 33 exceeds the compressive force in the relief spring 13, the poppet 12 will be moved rightwardly, as viewed in FIG. 1, by such pressure whereby the seal between the poppet insert 36 and seat 33 is eliminated. Fluid escapes or flows through the seat 33 along a relief flow circuit bounded by adjacent radial end faces of the poppet insert 36 and poppet body 35 and then axially along the longitudinal spaces 46, 47 and 48 and other clearance between the poppet body 35 and chamber wall 31. A substantial portion of the flow along the spaces 47 and 48 passes through the associated radial poppet openings 53 and 54 and eventually through the vent hole 61. The openings 53 and 54 are balanced to prevent lateral movement of the poppet 12 and prevent the possibility of a fluid lock condition at high pressure if the outer end of the poppet 12 were to make sealing engagement with the inner end of the plug 14.

Fluid flow along the space 46 passes across the far or outward end of the poppet 12 and eventually through the vent hole 61. An additional but minor amount of fluid flows axially along the diametral clearance between the cylindrical poppet surface portion 38 and the adjacent portion of the cylindrical surface or wall 31 of the chamber 36. Owing to the restricted cross-sectional area of this clearance and the consequent low flow rate through it in comparison to the much larger diametrically opposite space 46, there is an unbalanced pressure distribution on the poppet assembly 12 resulting in a lateral or leftward force on the poppet 12, as viewed in FIG. 2.

This unbalanced pressure force developed by relief flow causes the poppet 12 to move laterally or radially against the cylindrical surface 31 of the chamber 26 into frictional engagement at longitudinal points 64 and 65 formed by the intersections of the planar poppet surface 41 and cylindrical poppet surfaces 39 and 40. This frictional engagement between the poppet 12 and its receiving or guide chamber 26 damps undesirable random movement or chatter of the poppet which may otherwise be caused, for example, by remote sources of pressure pulsations. This damping or stabilization of the poppet 12 eliminates premature wear of the sealing surfaces of the seat 33 and sealing member 36 and erratic pressure control.

Although a preferred embodiment of this invention is illustrated, it is to be understood that various modifications and rearrangements of parts may be resorted to without departing from the scope of the invention as defined in the following claims.

What is claimed is:

1. A relief valve assembly comprising a valve port having a seat, a poppet chamber, a poppet slidably positioned in said chamber and adapted to sealingly engage the valve seat, means yieldably biasing said poppet against the valve seat and adapted to permit the poppet to move axially to a second relief position out of sealing engagement with the valve seat when fluid pressure in the port exceeds a predetermined level, said poppet and chamber forming a relief flow circuit wherein fluid pressure develops a lateral force on the poppet causing the poppet to frictionally engage a wall of the chamber to damp axial movement thereof between said first and second positions, said relief flow circuit being formed by an interior surface of said chamber and an exterior surface of said poppet.

2. A relief valve assembly as set forth in claim 1 wherein the interior surface of said chamber is substantially cylindrical and the poppet includes an exterior cylindrical first surface portion in close proximity to an area of said cylindrical chamber surface and a diametrally opposite second surface portion having a spacing from an adjacent chamber surface area substantially greater than the cylindrical first portion spacing from the proximate chamber surface area.

3. A relief valve comprising a body having a port adapted to communicate with a system containing pressurized fluid, the port including an axial circular valve seat, and an internal axial poppet receiving chamber communicating with the valve seat, at least a portion of the chamber adjacent the valve seat having a cylindrical surface of a diameter greater than the diameter of the valve seat, a relief poppet in said chamber having at one end a face for sealing said valve seat, a relief spring disposed at an end of the poppet opposite said one end, means for maintaining a minimum predetermined compression force in said release spring against said poppet and said valve seat, said poppet having an exterior surface including a cylindrical portion of a diameter slightly less than said chamber diameter and in close proximity to a surface area of said chamber, said exterior poppet surface having a second portion diametrically opposite said cylindrical portion and substantially planar, a relief flow circuit formed by clearance between said cylindrical poppet surface portion and the proximate chamber surface area and between said planar poppet surface portion and an adjacent chamber surface area, means for venting relief flow from said circuit, the relative size of said cylindrical and planar poppet surface portions and their respective clearances with the associated chamber areas being arranged such that during relief flow the force of fluid pressure along the planar poppet surface portion is substantially less than the force of fluid pressure along the cylindrical poppet surface portion whereby a net lateral force is produced on the poppet to cause it to frictionally engage the chamber surface at its planar surface side.

4. A relief valve comprising a valve port having a seat, a poppet adapted to sealingly engage the valve seat, means for resiliently biasing the poppet to a first port sealing position and adapted to allow the poppet to move to a second non-sealing relief position when fluid pressure in the port is above a predetermined level, said poppet being slidably disposed in an axially extending guide chamber, said chamber limiting movement of the poppet from said first position to said second position in a generally axial direction, said chamber and said poppet being arranged to permit passage of relief flow therebetween, means responsive to relief flow through said port causing friction damping of movement of said poppet between said first position and said second position, said flow responsive means being formed by the interior surfaces of the chamber and the exterior surfaces of said poppet, said chamber and poppet surfaces mutually forming a relief flow circuit having a fluid pressure distribution under flow conditions resulting in a lateral force on said poppet causing the surface of said poppet to laterally frictionally engage an opposed surface of said chamber.

\* \* \* \* \*

UNITED STATES PATENT OFFICE
CERTIFICATE OF CORRECTION

Patent No. 3,782,412  Dated January 1, 1974

Inventor(s) Raymond Nicholas Darash

It is certified that error appears in the above-identified patent and that said Letters Patent are hereby corrected as shown below:

ON THE FIRST PAGE, FOLLOWING THE FIRST PAGE OF DRAWINGS,

IN THE CAPTION, UNDER BRACKETED NUMBER [73],

After [73] Assignee: and after "The" change "Weatherland" to

-- Weatherhead -- .

Signed and sealed this 9th day of April 1974.

(SEAL)
Attest:

EDWARD M. FLETCHER, JR.
Attesting Officer

C. MARSHALL DANN
Commissioner of Patents